United States Patent [19]

Vignes et al.

[11] 4,386,413
[45] May 31, 1983

[54] METHOD AND APPARATUS OF PROVIDING A RESULT OF A NUMERICAL CALCULATION WITH THE NUMBER OF EXACT SIGNIFICANT FIGURES

[75] Inventors: Jean P. Vignes, Rueil-Malmaison; Vincent Ung, La Varenne, both of France

[73] Assignee: Agence Nationale de Valorisation de la Recherche (ANVAR), France

[21] Appl. No.: 142,738

[22] Filed: Apr. 22, 1980

[30] Foreign Application Priority Data

Apr. 23, 1979 [FR] France .................. 79 10244

[51] Int. Cl.³ .................................. G06F 7/38
[52] U.S. Cl. ........................... 364/748; 364/745
[58] Field of Search ..................... 364/748, 745

[56] References Cited

U.S. PATENT DOCUMENTS 4,149,261 4/1979 Harigaya et al. ............... 364/745

OTHER PUBLICATIONS

Frye, "Floating Point Guard Digit" *IBM Tech. Disclosure Bulletin* vol. 10, No. 10 Mar. 1968, pp. 1523-1524.
IEEE Transactions on Computers, vol. C-26, Jul. 1977, No. 7, New York (US) D. J. Kuck et al.: "Analysis of Rounding Methods in Floating-Point Arithmetic", pp. 643-650.
IEE Transactions on Computers, vol. C-22, Jun. 1973, No. 6 New York (US) J. M. Yohe: "Roundings in Floating-Point-Arithmetic", pp. 577-586.
Proceedings of the Spring Joint Computer Conference:
AFIPS Conference Proceedings, vol. 38, 1971 Montvale, New Jersey (U.S.) H. S. Bright et al.: "A Software System for Tracing Numerical Significance During Computer Program Execution", pp. 387-392.

*Primary Examiner*—David H. Malzahn
*Attorney, Agent, or Firm*—Lewis H. Eslinger

[57] ABSTRACT

A method and a digital computer for providing the result of a calculation performed upon data having a floating point representation, with the number of exact significant figures in this result. With every mantissa of initial data is associated an item of error information having a floating point representation and which has a value of zero when the real value of the initial data and the value thereof in its digital representation coincide and which does not have a value of zero when the real value of the initial data and the value thereof in its digital representation do not coincide. The first operation is carried out by employing the digital representation and the item of error information of the mantissa in order to calculate a mean value of the mantissa of the result and the item of error information associated with the mean value. Each other operation is carried out by employing, in case of need, as a non-initial piece of data, the result of a preceding operation in the form of its calculated mantissa mean value and item of error information. The number of exact significant figures in the final result is determined from the calculated values of the mean value and error information of the mantissa of the final result.

9 Claims, 9 Drawing Figures

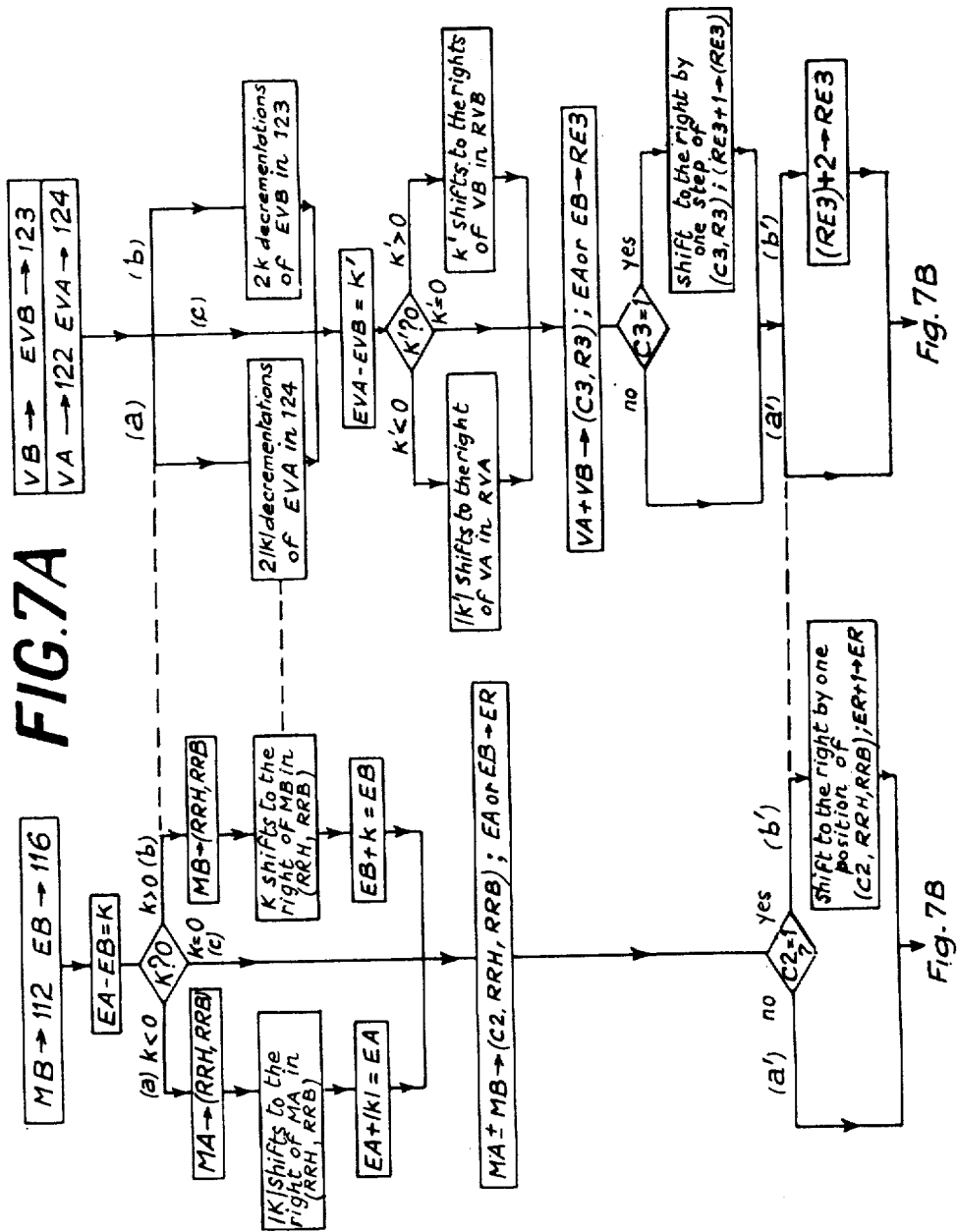

METHOD AND APPARATUS OF PROVIDING A RESULT OF A NUMERICAL CALCULATION WITH THE NUMBER OF EXACT SIGNIFICANT FIGURES

The present invention refers to a method of providing, by means of a digital computer device, the result of a calculation with the number of exact significant figures in this result.

The invention also refers to a digital computer device which puts this method into effect and forms a computing processor having controlled accuracy.

The field of application of the invention is that of digital computers working especially upon numerical data having a floating point representation with mantissa and exponent.

The representation of numbers in a computer is effected by means of a finite number of significant figures which necessarily brings about a loss of accuracy. When the computers perform arithmetic operations with truncation, the value of the number employed is always the value approximated from below. When one performs arithmetic operations with rounding off, the values of the numbers employed are values approximated from above or from below. In any case, the results are vitiated by error.

The aim of the present invention is to provide a method which enables the number of exact significant figures to be obtained from calculations effected by means of a digital computer device.

This aim is attained in accordance with the invention by a method in accordance with which, for a calculation effected upon digital data having a floating point representation on a numeration base b:

associating with every mantissa of a piece of initial digital data an item of error information having a floating point representation, which has a value of zero when the real value of the piece of initial data and the value in the digital representation employed for the calculation coincide and which does not have a value of zero when the real value of the piece of initial data and the digital representation employed for the calculation do not coincide;

carrying out a first arithmetical operation upon one or more initial pieces of data by employing the digital representation and the error information of the mantissa of each of these first initial pieces of data in order to first calculate a mean value of the mantissa of the result and secondly to calculate the item of error information associated with the mean value of the mantissa;

calculating each of other possble arithmetical operations of the calculation by employing, in case of need, as a non-initial piece of data, the result of a preceding operation, the mean value and the item of error information of the mantissa of this non-initial piece of data being the calculated mean value and the calculated error information of the mantissa of the result of the preceding operation; and determining the number of exact significant figures in the final result from the calculated values of the means value and or the error information of the mantissa of the final result.

The term "a piece of initial data" refers to a piece of data which has not undergone any arithmetical processing. One may associate with each piece of data employed in the calculation an item of binary information having a first or a second state according to whether this piece of data is a piece of initial data or whether it has already undergone at least one arithmetical process.

When the real value of the piece of initial data cannot be transcribed exactly into the format $n+1$ employed for the calculation one may adopt either the rounded-off value of the mantissa or the truncated value.

In the first case, the item of error information associated with the mantissa of the piece of initial data will be determined by evaluating the error carried out during the course of the operation of rounding-off within the bounds of the computing capacities available. Thus, for example, if the piece of initial data appears with a format $n+1+n'$, one will adopt for evaluating the item of error information the contents of the n' lowest positions or the complement of these contents depending upon the direction of the rounding-off. Insofar as n' exceeds the available capacities of registration it will be satisfactory to use a truncated value of n'.

The mantissa of the result of an arithmetical operation effected upon the rounded-off pieces of initial data is hereinafter called the mantissa of mean value although it is not a question of a mean value in the normal sense of the word, by analogy with the case of the truncation envisaged later. The item of error information associated with the mantissa of mean value of the result is the variance or standard deviation calculated on the basis of the items of error information associated with the rounded-off pieces of initial data.

In accordance with a preferred method of implementation of the invention, when acquiring a piece of initial data one will adopt the truncated value of its mantissa will be adopted when this mantissa cannot be transcribed into the format employed by the calculation.

In this case, with each initial piece of data is associated an item of truncation information (T) which has a first or a second state according to whether the real value of the mantissa is or is not truncated in the digital representation employed for the calculation, and each mantissa of an initial piece of data having n positions is transformed into a mean value of length $n+1$ by introducing into the $(n+1)$th position the value $\frac{1}{2}b^{-n}$ or the value 0 according to whether the truncation information associated with this initial piece of data is in its first or in its second state.

The mean value of the mantissa of the result of an arithmetical operation carried out upon the truncated initial pieces of data is the mean value of the results which may be obtained for all the possible combinations of values approximated from above and from below of the truncated mantissae of these initial pieces of data. The item of error information associated with a mantissa of a truncated initial piece of data is the variance $\frac{1}{2}b^{-2n}$ or the standard deviation $\frac{1}{2}b^{-n}$. The item of error information associated with the mantissa of mean value of the result of a mathematical operation dealing with truncated pieces of initial data is the variance or the standard deviation calculated upon the basis of the items of error information associated with these pieces of initial data.

In the remainder of the description the case will always be considered in which the pieces of initial data are truncated when they cannot be exactly transcribed into the format employed.

The item of error information (variance or standard deviation) relative to the mantissa of a piece of data or of a result has a floating point representation.

Thus each processing of a mantissa of a piece of data is accompanied by a processing of the associated item of error information.

Thus for each operation of normalization (shifting to the left) or of denormalization (shifting to the right) of a mantissa of mean value, the exponent of this mean value is decremented or incremented by a number of steps which is a function of the number of shifts of the mantissa and the exponent of the associated item of error information is decremented or incremented by a double number of steps when the item of error information is the variance or by the same number of steps when the item of error information is the standard deviation.

Furthermore for each truncation of the mantissa the associated standard deviation or variance is brought up to date by adding to it the truncated portion of the mantissa or the square of it.

In a conventional computer the information which is lost as a result of truncation or rounding-off is not processed. Hence one cannot introduce directly into it the method in accordance with the invention.

Also the invention further refers to a computer device which can put into effect the method in accordance with the invention, the device being of the type including at least one computer unit, at least one register for the exponent of the operand and one register for the mantissa of the operand, a local memory and a control member for emitting signals commanding the execution of elementary operations as a function of instructions delivered by a command memory and relative to the arithmetical operations of a calculation to be effected.

Such a structure of a computer device is that of the microprogrammed devices the technique of which is well known.

The aim of the invention is to complete a device of this type in order to render it suitable for the execution of the method in accordance with the invention as defined above and thus to obtain a processor for calculation with controlled accuracy.

This aim is attained by a device which includes in accordance with the invention:

at least one register having n+1 positions for the mantissa of a piece of data and one corresponding register for the exponent of a piece of data;

at least one register for the mantissa of the item of information of error in data and one corresponding register for the exponent of the item of information of error in data;

computer means connected to the registers for the mantissae and exponents to provide the mantissae and exponents of the mean value and each item of error information of the mantissa of the result of each arithmetical operation performed upon one or more pieces of data; and a control member being connected to the registers and computer means in order to command the execution of each elementary operation of an arithmetical operation and in order to command the calculation of the number of exact significant figures in the mantissa of the final result obtained.

For calculation of the mean values, the items of error information and the number of significant figures, means of calculation may be employed which are distinct or partially identical.

Thus, having a main computer unit destined for the calculation to be carried out upon the exponents and mantissae of mean values, the resources of this computer unit may be employed for the calculations to be carried out upon the exponents and mantissae of the items of error information or an independent auxiliary computer unit may be provided for carrying out the latter calculations. As to the calculation of the number of exact significant figures, it may be carried out by means of the main or auxiliary computer unit, or may be carried out by means of a special independent computer unit. In all of these cases an essential characteristic of the computer device in accordance with the invention is the presence of a control member for jointly commanding the calculations relative to the mean value and those relative to the error information, these being calculations which may be carried out in parallel in a nearly synchronous fashion or which must be carried out in sequence, depending upon the architecture retained for the computer device.

The computer device includes at least one register for the mantissa of the result, preferably of double length, that is to say, having $2n+2$ positions. The upper portion of the register ($n+1$ positions of the highest significance) contains the value which will be preserved for the pursuit of the calculation or for the determination of the number of exact significant figures. The low portion of the register (the $n+1$ positions of lowest significance) is advantageously employed for bringing up to date the item of error information associated with the mantissa of the result taken off from the upper portion of the register.

In order to effect this bringing up to date, means may be provided which are connected to the low portion of the register so that in the event of truncation, the square of the truncated portion is added to the variance or to the standard deviation raised to the second power.

In accordance with another special feature of the device in accordance with the invention, the position of lowest significance in the low portion of the register for the mantissa of the result is looped back on itself. Thus in the event of denormalization of a mantissa of a piece of data, there is no risk of this piece of data being completely lost, especially for the bringing up to date of the item of error information, because of a large number of steps of shifting to the right.

In the foregoing the case has been envisaged where the mantissa of the result available in the register of double length is put into the format by truncation. By way of variant the putting into format may be effected by rounding-off. In this latter case the bringing up to date of the associated item of error information is realised by adding to it the square of the contents of the low portion of the register or of its complement with respect to the base, the item of error information being represented by the variance or the standard deviation raised to the second power.

Other special features and advantages of the method and of the device in accordance with the invention will be evident from reading the description given below by way of indication but non-restrictively, with reference to the attached drawings in which:

FIG. 6 is a block diagram a portion of the device of FIG. 1; working in decimal-coded binary representation; and FIGS. 7a-7b and 8 are sequence charts illustrating the operations of the units of FIGS. 3 and 4 carried out in accordance with the present invention, being respectively an addition and multiplication.

Figure 1:
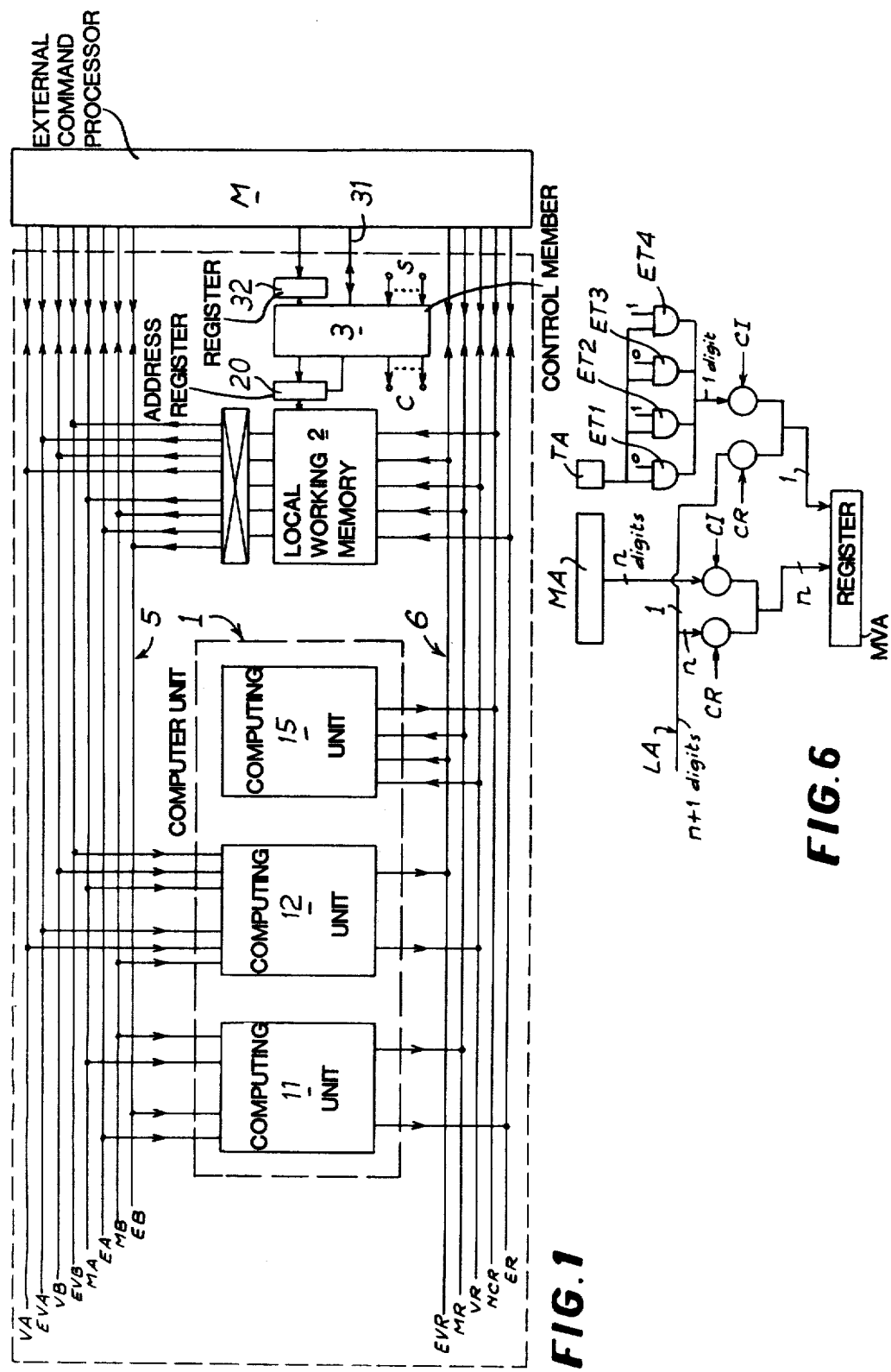
FIG. 1 is a block diagram of a computer device in accordance with the present invention.

The computer device illustrated in FIG. 1 includes a computer unit 1, a local working memory 2 and a control member 3. This computer device is connected to a central memory or to an external command processor indicated diagrammatically at M.

The operands are transmitted to the computer unit 1 by data lines 5 while the results of the calculations carried out by the unit 1 are available on the data lines 6.

The control member 3 is connected to the processor M by an input-output connection 31 and a register 32. The processor M delivers to the control member 3 instructions relative to the arithmetical operations to be carried out for a certain calculation. These instructions are stored in sequence in the register 32 and are read by the control member 3 as the operations develop.

For each instruction received corresponding with an arithmetical operation to be carried out, the control member 3 provides command signals C according to the micro-programme selected by the instruction in the control member 3 and according to signals S worked out at different levels of the computer unit 1.

The control member 3 is connected to an address register 20 associated with the working memory 2 for commanding the writing or reading of a piece of data to a certain address in this memory.

The memory 2 has its input connected first to the data lines 6 for possible storage by way of data, of intermediate results provided by the computer unit and secondly to the processor M for the storage of new data.

Figure 2:
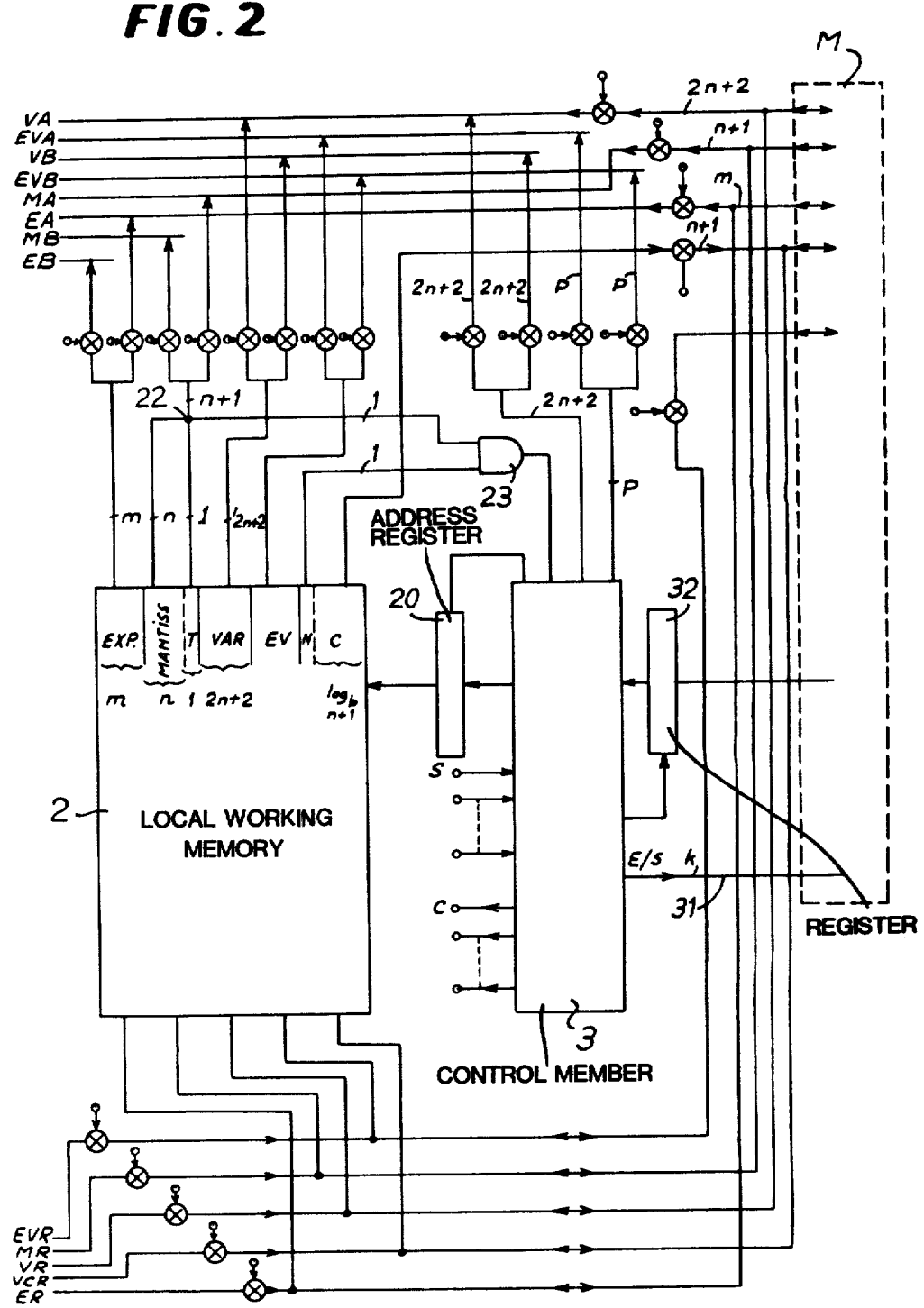
FIG. 2 is a block diagram of a portion of the device of FIG. 1, illustrating the connections of the local working memory, the control memory and registers associated therewith.
Figure 3:
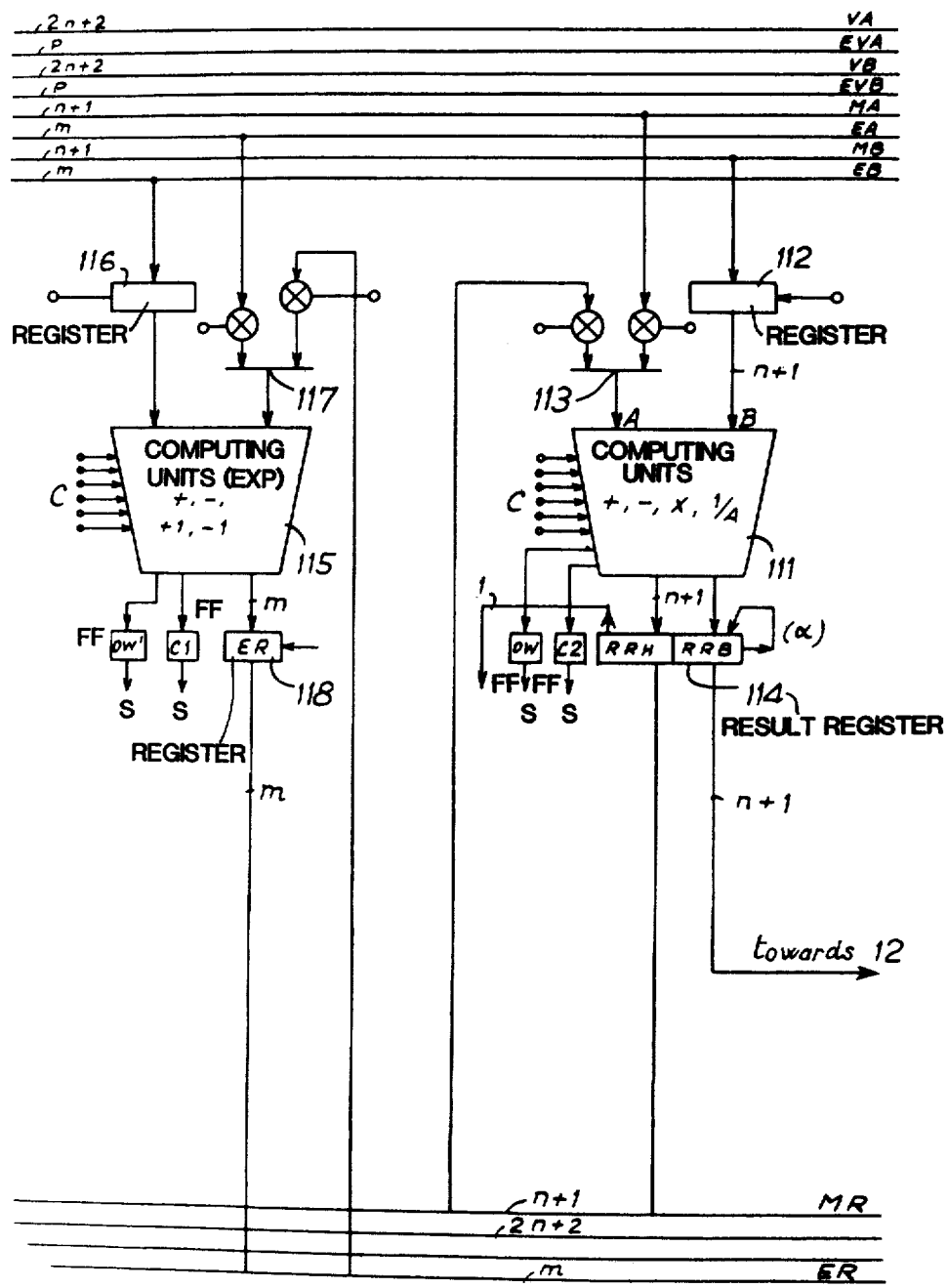
FIG. 3 is a block diagram of one embodiment of the computing unit of the device of FIG. 1 which calculates mean values of results.
Figure 4:
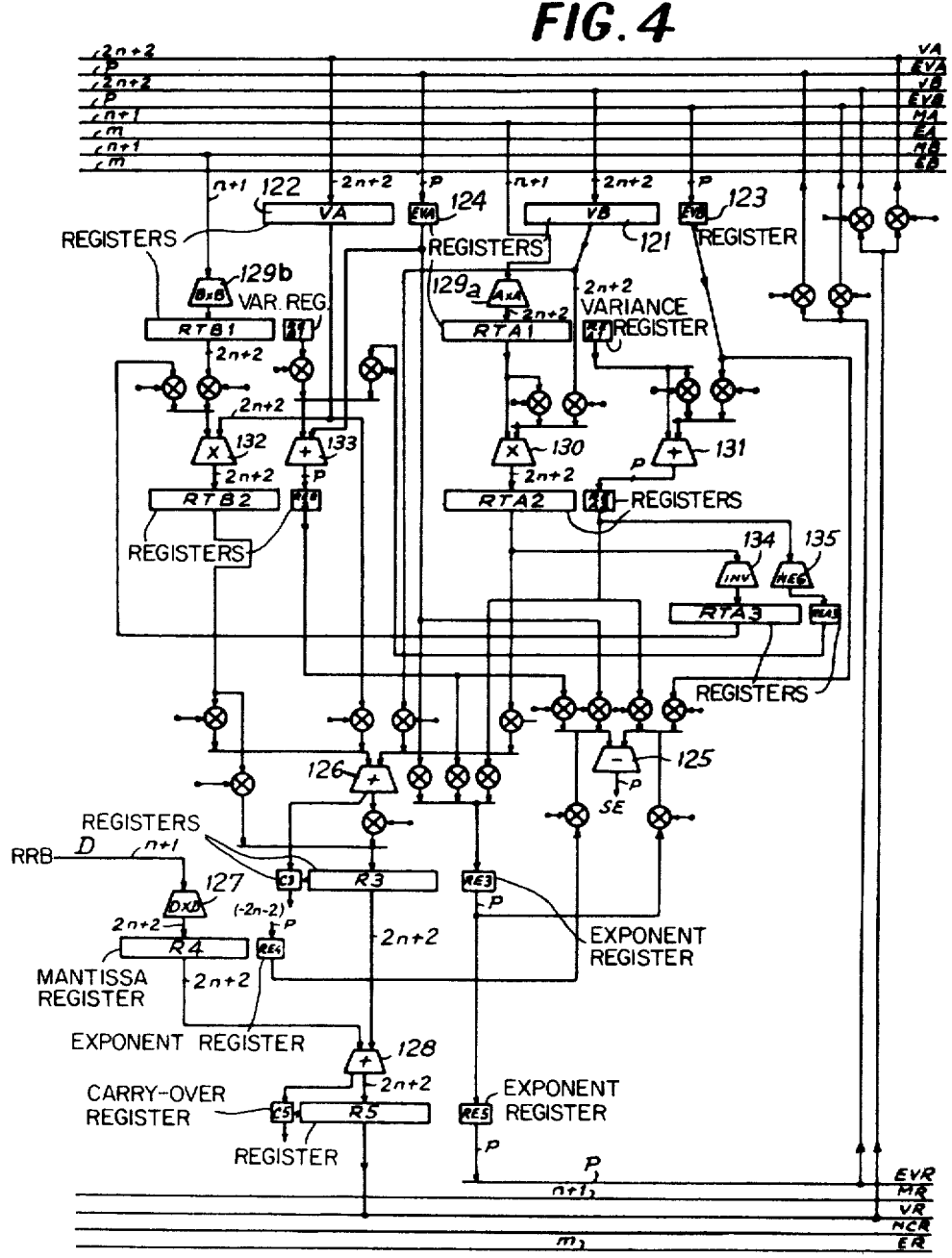
FIG. 4 is a block diagram of one embodiment of the computing unit of the device of FIG. 1 which calculates variances associated with the mean values of mantissae.

The output from the memory 2 is connected to the data lines 5. These are likewise connected to the data lines 6 and to the processor M for direct transfer to the input to the computer unit 1 either of an intermediate result provided by this computer unit or of a new piece of data (FIGS. 2 and 3).

As the computer device is working upon numbers having a floating point representation, the computer unit 1 contains the necessary units for carrying out the elementary operations on the mantissae and exponents under the command of the control member 3.

A computer device as described above is of the type of those which implement known techniques of micro-programming.

This computer device is distinguished from the prior art in that it includes specific means intended for the determination of the number of exact significant figures in the result of a calculation carried out by the device itself.

When performing arithmetic operations with truncation (or with rounding-off), for each piece of data which cannot exactly be represented in the format employed, an error is committed which is equal to the value of the truncated portion of the mantissa (or possibly of its complement when one is working with rounding-off).

In the case of a calculation carried out upon truncated (or rounded-off) data, a set of values of results exists, all of which are as representative as one another of the exact results. These values of results are those which may be obtained by combining in every possible way the values approximated from above and from below of the pieces of data.

Starting from two truncated pieces of initial data A and B of mantissae MA and MB of length n on a base b a set of possible results for an operation $\otimes$ comprises: $R1 = MA \otimes MB$; $R2 = (MA + b^{-n}) \otimes MB$; $R3 = MA \otimes (MB + b^{-n})$; and $R4 = (MA + b^{-n}) \otimes (MB + b^{-n})$.

One can define a mean value of the mantissa of the result MR equal to the mean value of the mantissae of the different results and an associated item of error information (variance or standard deviation) having a floating point representation with the mantissa VR and the exponent EVR. When this result is reused as a piece of data, the quantities MR, VR and EVR are employed for the calculation of the mean value and of the item of error information of the mantissa of the new result.

At the end of the calculation the final result is available in the form of the mean value MR of the mantissa, of its exponent ER and of the item of error information (VR, EVR) of its mantissa. The number C of significant figures in MR may then be determined by the following formula:

$$b^{-C} = (VR, EVR)^{\frac{1}{2}}/MR$$

(in numeration base b), C being the integer value rounded-off from C' and (VR, EVR) the variance.

In accordance with the invention the computer device is equipped with means enabling the carrying out not only of the calculation of the result of each operation but on the one hand the calculation of the mean value of the mantissa of the result and on the other hand the calculation of the item of error information associated with this mean value. In addition means are provided for determining the number of significant figures in the final result. Finally other means are provided for transforming each mantissa of a truncated piece of initial data into a pair comprising the mean value and the item of error information.

In the whole of the description which is to follow, the item of error information associated with a mantissa of a piece of data or of a result is the variance.

A particular embodiment of a device in accordance with the invention which works upon numbers in binary numeration will now be described in detail by reference to FIGS. 1 to 5. In other embodiments the base of numeration may adopt another value, for example, 10 or 16.

Each piece of data A or B has a floating point representation with an exponent EA, EB of length m and a mantissa MA, MB of length n.

To each piece of initial data is added an item of truncation information T having a first state (for example, 1) when the mantissa of the piece of data is truncated in its representation in the format n and a second state (for example, 0) when the piece of data is not truncated.

An item of information N is likewise added to each piece of data, having a first state (for example, 1) when this piece of data is new, that is to say, has not undergone any previous operation during the course of the calculation, and a second state (for example, 0) when this piece of data is not new.

With each piece of data, A,B is associated the variance relative to its mantissa, this variance being represented as having a floating decimal point by its mantissa VA, VB and its exponent EVA, EVB.

Hence a piece of data (for example, A) is characterized by the following components:

| EA | MA | T | VA | EVA | N |

The exponents EA and EVA may be in the representation known as "biassed" or as a complement to one or two (in binary representation), or as a complement to nine or ten (in decimal representation), or else as an "absolute value+sign". The mantissa VA is always positive. The mantissa MA may be represented as an complement to one or to two or as an "absolute value+sign".

When a piece of data is an initial piece of data (N=1), its mantissa is transformed into a mantissa of mean value having n+1 positions and a variance is associated with it. This operation is carried out as follows.

If the piece of data introduced into the memory 2 is truncated (T=1) one adds to the mantissa of format n a bit "1" at the low-significance side (or $2^{-(n+1)}$) in order to obtain a mantissa of format n+1 representing the mean value between the value approximated from above and the value approximated from below from the initial mantissa in the format n. On the contrary, if the initial piece of data is not truncated (T=0) a bit "0" is added in the (n+1)th position. In practice, putting into the format n+1 is carried out simply by adding the binary item of information T onto the mantissa of the initial piece of data at the output from the memory 2 (see the junction 22 in FIG. 2). This output is connected to those two lines among the data lines 5 which are destined for the mantissae MA, MB, while the exponent of format M of the piece of data is available at the output from the memory 2 connected to the two data lines destined for the exponents EA, EB.

Simultaneously one associates with the piece of data when it is new a zero variance when the initial piece of data is not truncated (N=1, T=0) and a value equal to $2^{-(2n+2)}$ when the initial piece of data is truncated (N=1, T=1). The condition N and T=1 is detected by a gate 23, which authorizes the development by the control member 3 of a value $2^{-(2n+2)}$ at its output connected to those two lines among the data lines 5 which are intended for the mantissae VA, VB, while the exponent of format p is available at the output from the control member, which is connected to those two lines which are destined for the exponents EVA, EVB.

Once the data has been put into format and associated with a variance (zero or not) it is transmitted to the computer unit. The computer assembly 1 includes a computing unit 11 for the calculation of the mathematical expectations or mean values of results, a computing unit 12 for the calculation of the variances associated with the mean values of mantissae and a computing unit 15 for the final calculation of the number of significant figures.

The computing unit 11 (FIG. 3) includes a set of units 111 for effecting the operations, as known in themselves, of addition, subtraction, of multiplication and of transposition upon the mantissae of the operands. A register 112 having n+1 positions is connected to one (for example, the one destined for MB) of the two data lines destined for the mantissae of mean values and has its output connected to the set of units 111. The other mantissa of mean value (MA in the example illustrated) is transmitted to the set 111 by a bus multiplexer 113. Of course a special register might also be destined for this mantissa.

The output from the set 111 is connected to a result register 114 of double length having (2n+2) positions. The mantissa of the result is taken off from the upper half RRH having n+1 positions of the register 114 and is available on the bus MR which is the one of the data lines 6 destined for the mantissa of the result MR. The truncated portion of the result, appearing in the low portion RRB having n+1 positions of the register 114 is transmitted to the unit 12 for bringing up to date the variance associated with the result, as explained in greater detail later. The last position in the register 114 is looped back on itself. Thus, whatever the number of shifts to the right carried out in the register 114, at a time when the latter contains initially a number which is not zero, a "1" will remain in the (2n+2)th position and not all trace of the initial number will be lost (looping back through the connection α) with a view to the error calculation.

An overflow flip-flop OW and a carry-over flip-flop C2, which are well known, are also associated with the set of units 111. Their contents as well as a connection for overflow of the capacity of the register 114 provides signals S to the control member 3.

The output from the upper portion of the result register 114 is looped back onto the input to the set 111 through the bus 113 so as to enable immediate reuse of the contents of the register 114 for the sequence of the calculation.

The computing unit 11 includes another set of units 115 for performing upon the exponents of the mean values, the operations of addition and subtraction between two exponents and of addition or subtraction of 1 (in response to a shift of one step to the right or left of the associated mantissa). A register 116 having m positions is connected to one (EB in the example illustrated) of the two buses 5 destined for the exponents of the mean values and has its output connected to the set of units 115. The other exponent (EA) is transmitted to the set 115 by a bus multiplexer 117.

The output from the set 115 is connected to a register 118 of single length having m positions. The exponent of the result of which the mantissa appears in the register 114 is taken off from the register 118 and is transmitted over that line among the data lines 6 which is destined for the exponent of the result ER.

Flip-flops for carry-over C1 and for overflow OW' are associated with the set of units 115 and supply state signals S to the control member 3.

The output from the register 118 is looped back onto the input to the set 115 through the bus 117 so as to be able to reuse the contents of the register 118 directly for the sequence of the calculation.

The unit for computing variance 12 (FIG. 4) contains a number of registers and units for carrying out the calculation of the variances associated with the mantissae of the results calculated in the unit 11.

These registers and units as well as their interconnections will be dealt with in detail below at the time of the description of the development of a number of arithmetical operations. The operations of algebraic addition, multiplication and transposition will only be described below. Subtraction is a particular case of algebraic addition and division is the product of a transposition and a multiplication.

Algebraic addition

Figure 7B:
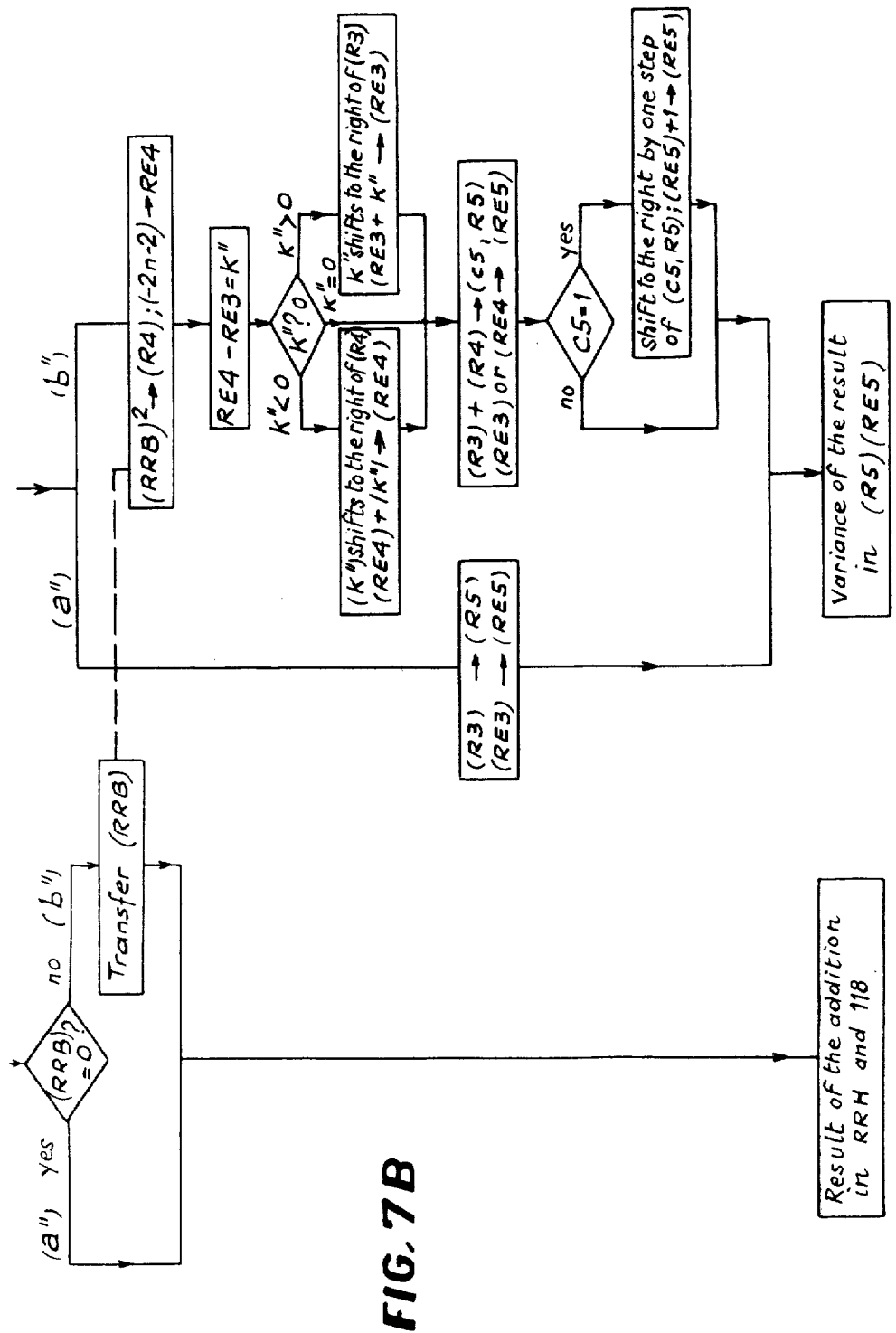

The elementary operations of an algebraic addition are shown diagrammatically on the sequencer charts of FIGS. 7a-7b.

The pieces of data A and B to be added are available in the form of mantissae MA, MB and exponents EA, EB of the mean values and of mantissae VA, VB and exponents EVA, EVB of the variances associated with the mantissae MA, MB. It may be assumed that the mantissa is represented as "absolute value + sign" and the exponents as a complement to two. The processing of the signs is effected separately as is well known.

For the calculation of the mean value the following elementary operations are carried out:

loading of the mantissa MB into the register 112 and of the exponent EB into the register 116;

subtraction of EA-EB effected in the set 115; if the result K is negative, the mantissa MA is transferred into the register 114, $|K|$ shifts to the right (denormalization) with MA and so that EA is transformed into $EA+|K|=ER$; if the result K is positive, the mantissa MB is transferred into the register 114, K shifts to the right with MB so that EB is transformed into $EB+K=ER$; if the result K is zero, the operation passes directly to the next stage;

depending upon the signs of MA and MB, the operation $MA \pm MB$ is carried out in the set 111, which provides as its result the contents of (C2, RRH, RRB); if the carry-over C2 is zero, the operation passes directly to the next stage; if the carry-over C2 is equal to 1, the contents of (C2, RRH, RRB) are shifted to the right by one position to form $ER=ER+1$ in the register 118;

if the contents of (RRB) are not zero, the contents of (RRB) are transferred towards the unit 12;

the contents of (RRH) and of the register 118 are used to provide the mantissa MR and the exponent ER of the result of the algebraic addition.

For the calculation of the variance the following elementary operations are carried out (in FIGS. 7A, 7B. Those operations have been represented on the same lines, which develop in a corresponding way in the units 11 and 12):

the mantissae VB and VA are loaded into registers 121, 122 having (2n+2) positions, connected to those two lines among the data lines 5 which are destined for VB and VA, and the exponents EVB and EVA are locked into registers 123, 124 having p positions connected to those two lines among the data lines 5 which are destined for EVB and EVA;

if the number $K=EA-EB$ is negative, $2|K|$ decrementations of EVA in the register 124 are performed in order to obtain $EVA=EVA-2|K|$; if the number K is positive, 2 K decrementations of EVB in the register 123 are performed in order to obtain $EVB=EVB-2K$ (it will be observed that one of the characteristics of the invention is to associate the shifting of a mantissa of mean value with the incrementation—or decrementation—by a corresponding number of steps, of the exponent of this mean value and with the incrementation—or decrementation—by a double number of steps, of the exponent of the variance associated with this mantissa; —subtraction of $EVA-EVB=K'$ is carried out in the unit 125; if K' is negative, $|K'|$ shifts to the right with VA in the register 122; if K' is positive, K' shifts to the right with VB in the register 121; if K' is zero, the operation passes directly to the next stage;

the sum VA+VB is carried out by means of the unit 126, the result being available in the register R3 with which is associated the carry-over register C3; the exponent ER, determined after possible denormalization of one of the operands, before examination of the carry-over C3, is stored in a register RE3, if the carry-over C3 is equal to 1, shifting to the right by one position of the contents of (C3, R3) and incrementation of the exponent in the register RE3 by one unit results: the content (RE3) of this register thus becomes $(RE3)=(RE3)+1$;

if the carry-over C2 is equal to 1, double incrementation of (RE3) in parallel with the single incrementation of ER results: $(RE3)=(RE3)+2$;

if the content of RRB is not zero on the bus D it is raised to the second power by the unit 127; the result is transferred into the mantissa register R4 having (2n+2) positions, while the quantity $-(2n+2)$ is loaded into the associated exponent register RE4 having p positions; the addition of the contents of the registers R3 and R4 is then carried out in unit 128: the difference $K''=(RE4)-(RE3)$ is calculated by the unit 125; if K'' is negative, $|K''|$ shifts the contents of R4 to the right so that addition of $|K''|$ to the content of RE4 results: $(RE4)=(RE4)+|K''|$; if K'' is positive, K'' shifts the contents of R3 to the right so that addition of K'' to the content of RE3 results: $(RE3)=(RE3)+K''$; if K'' is zero, the operation passes directly to the next stage which adds the contents of the registers R3 and R4 by means of the unit 128 and transfers the sum into the register R5 having (2n+2) positions, with which is associated the carryover register C5 and the exponent register RE5; the content of RE3 (or RE4) is transferred into RE5 and if the contents of (C5) is equal to 1, shifting of the content of (C5, R5) to the right by one step results so as to add 1 to the content of RE5: $(RE5)=(RE5)+1$;

if the content of RRB was zero, there is a simple transfer of the contents of R3 and RE3 into R5 and RE5;

there is finally available in R5 and RE5 the mantissa and the exponent of the variance associated with the result of the addition carried out in the computing unit 11.

As is evident from the foregoing, the variance associated with the result of the addition of the pieces of data A and B is equal to the sum of the variances associated with these data, increased by the square of the contents of the low portion of the result register of the mean value computing unit.

The development is now described below, of an operation of multiplication.

Algebraic multiplication

Figure 8:
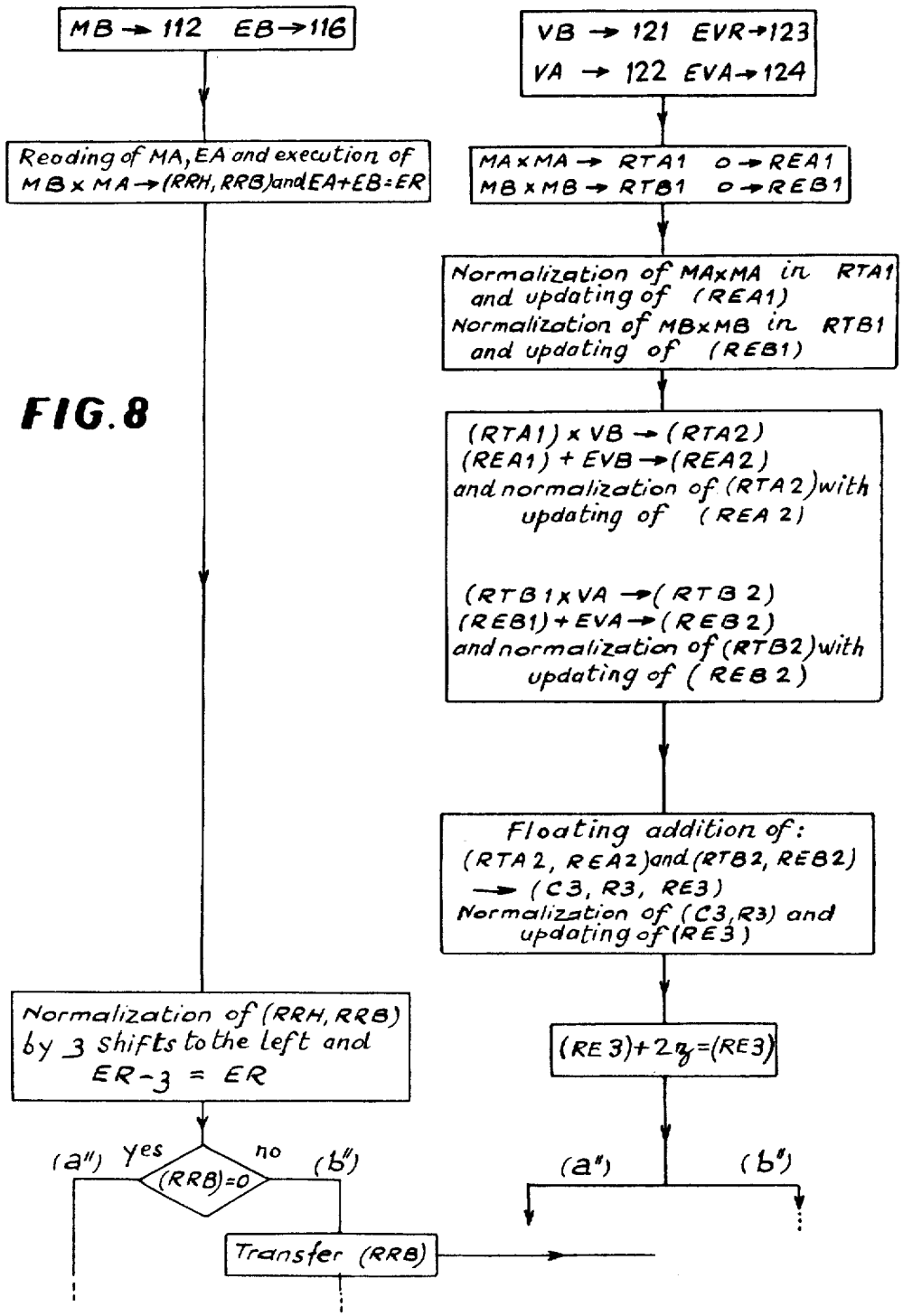

The elementary operations of an algebraic multiplication are shown diagrammatically in the sequencer charts in FIG. 8.

As previously stated, the pieces of data A and B to be multiplied together are available in the form of a mean value (MA, EA), (MB,EB) and of a variance (VA, EVA), (VB,EVB). The signs of the mantissae are dealt with separately in this example.

For the calculation of the mean value of the product, the following operations are effected in the computing unit 11:

loading of the mantissa MB and of the exponent EB into the registers 112 and 116;

reading of MA and EA and execution in the set of units 111 of the product MA×MB stored in the register 114 and in the assembly 115 of the sum $ER = EA + EB$ stored in the register 118; the multiplication is carried out by a cabled unit or a sequential unit employing the method of successive addition-and-shifts, being a unit known in itself;

possible normalization of the contents of the register 115 (RRH, RRB) by z shifts to the left and transformation of ER into ER−z in the register 118;

if the contents of RRB are not zero, the contents are transferred into the computing unit 12;

the result of the multiplication is the mantissa taken from RRH and the exponent from the register 118.

The variance associated with the result of the multiplication A×B is equal to:

$MA^2(VB, EVB) + MB^2 (VA, EVA) + (RRB)^2$.

The following elementary operations are carried out (in FIG. 8 the operations have been represented in parallel, which develop correspondingly in the units 11 and 12):

loading the mantissae VB and VA into the registers 121, 122 and the exponents EVB, EVA into the registers 123, 124;

raising the mantissae MA and MB to the second power by means of units 129a and 129b and storage of the results thereof in registers RTA1 and RTB1 having (2n+2) positions, and loading of the value zero into the variance registers REA1 and REB1 associated with the registers RTA1 and RTBL;

normalization of MA×MA in the register RTA1 (×A1 shifts to the left) and correspondingly bringing up to date $(REA1) = (REA1) + xA1$; normalization of MB×MB in the register RTB1 (×B1 shifts to the left) and correspondingly bringing up to date $(REB1) = REB1 + xB1$;

calculation of $MA^2$ (VB,EBV) by carrying out the product (RTA1)×VB by means of the unit 130, and the sum REA1+EVB by means of the unit 131; storage of the product (RTA1)×VB in the register RTA2 having (2n+2) positions and of the sum; REA1+EVB in the register REA2 having p positions; normalization of the contents of the register RTA2 (xA2 shifts to the left) and bringing up to date $(REA2) = (REA2) + xA2$;

calculation of $MB^2$ (VA, EVA) by carrying out the product (RTB1)×VA by means of the unit 132, and the sum REB1+EVA by means of the unit 133; storage of the product (RTB1)×VB in the register RTB2 having (2n+2) positions and of the sum REB1+EVA in the register REB2; normalization of the contents of the register RTB2 (xB2 shifts to the left) and bringing up to date of $(REB2) = (REB2) + xB2$;

performing a floating addition of (RTA2, REA2) and (RTB2, REB2) by means of the units 125 and 126 (the realization of a floating addition is detailed above for the example of the arithmetical addition of two mean values); storage of the result of this addition in registers (C3, R3) for the mantissa and in register RE3 for the exponent; denormalization of (C3, R3) if C3=1 and correspondingly bringing up to date (RE3): $(RE3) = (RE3) + 1$;

bringing up to date (RE3) as a function of the number z of steps of shift carried out for the normalization of (RRH, RRB): $(RE3) = (RE3) + 2z$;

performing a floating addition of (R3, RE3) and of $(RRB)^2$ as indicated above with regard to the algebraic addition, the final result of the calculation of variance being available in R5 for the mantissa VR and in RE5 for the exponent EVR.

The development will now be described of an operation of transposition.

Transposition

The piece of data A to be transposed is available in the form of a mean value (MA, EA) and a variance (VA, EVA).

The following operations are effected in the unit 11:

transposition of MA in the set of units 111 and storage of 1/MA in the register 114;

negation of EA in the set of units 115 and storage of $ER = -EA$ in the register 118;

normalization of (RRH, RRB) in the register 118 (q shifts to the left) and bringing up to date the exponent in the register 118: $(ER) = (ER) - q$;

transferring (RRB) into the unit 12, the mantissa of the result being taken off from RRH.

The associated variance is given by the formula $(1/MA)^4 \times (VA, EVA)$. This calculation is carried out in the unit 12 as follows:

raising MA to the second power by the unit 129a and storage of the result in the register RTA1; loading of the value zero into REA1; normalization of MA×MA in RTA1 and correspondingly bringing up to date REA1;

raising MA×MA to the second power by the unit 130 and storage of the result in the register RTA2; calculation of (REA1)+(REA1) by the unit 131 and storage of the result in the register REA2; normalization of $(MA \times A)^2$ in RTA2 and correspondingly bringing up to date REA2;

transposition of the contents of RTA2 by means of the inverter unit 134 and storage of the result in the register RTA3; negation of the contents of REA2 by means of the unit 135 and storage of the result in the register REA3; normalization of (RTA3) and correspondingly bringing up to date (REA3);

calculation of (RTA3, REA3)×VA, EVA) by means of the units 132, 133 as described above for the calculation of $MB^2$ (VA,EVA) in the case of multiplication, and storage of the result in (RTB2) and (REB2);

transfer of the contents of (RTB2) and (REB2) into the registers R3 and RE3;

bringing up to date (RE3) as a function of the number q of steps of shift carried out for the normalization of (RRH, RRB); and performing a floating addition of (R3, RE3) and $(RRB)^2$ as indicated above, with the result available in (R5) and (RE5) for the mantissa VR and the exponent EVR of the variance being sought.

By combination of the three operations described above, any desirable calculations may be effected, each operation to be carried out being broken down into simple arithmetical operations.

Figure 5:
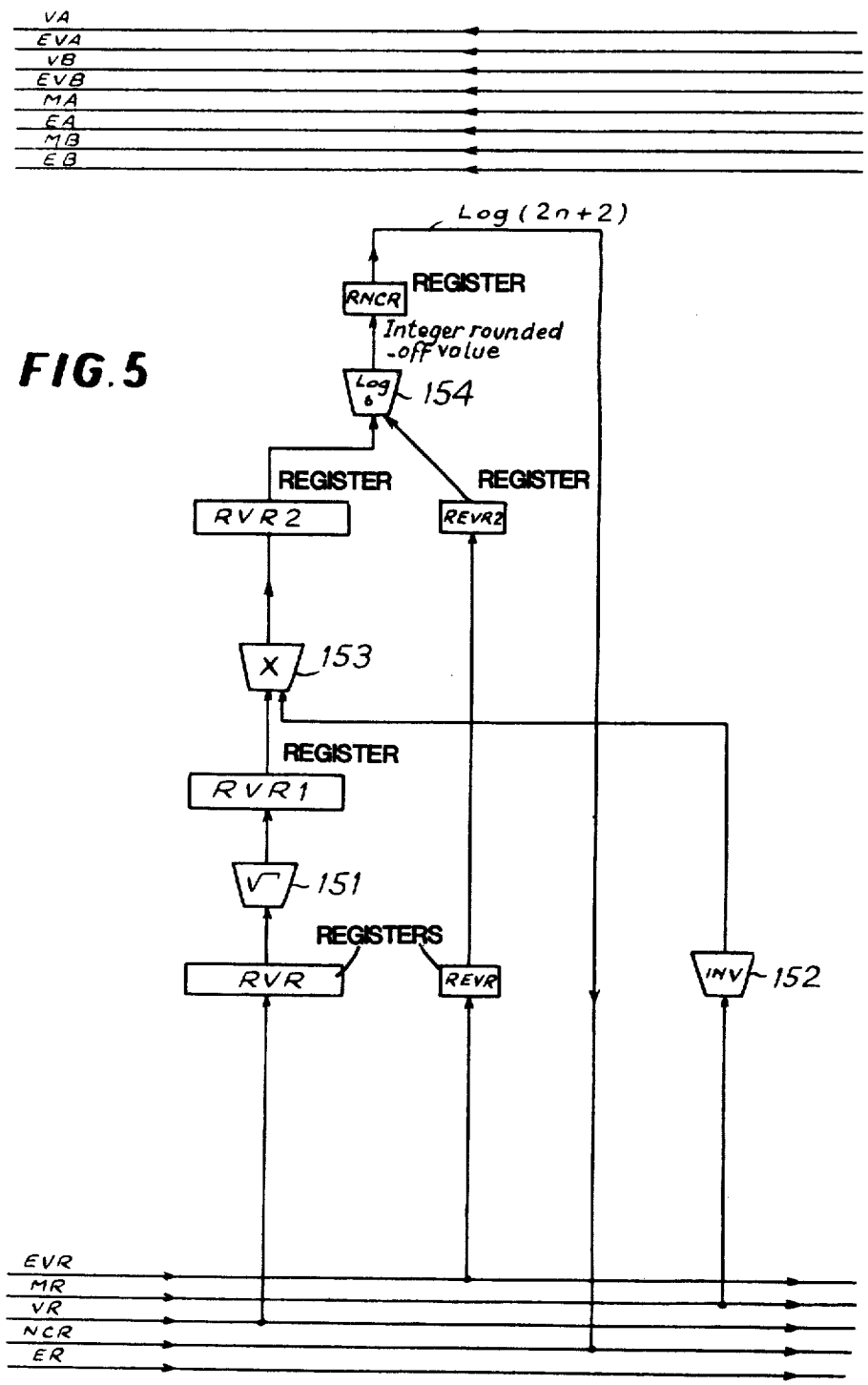
FIG. 5 is a block diagram of one embodiment of the computing unit of the device of FIG. 1 which performs a final calculation of the number of exact significant figures.

When a final result is available in the form of the mean value (MR,ER) and the variance (VR, EVR) associated with MR, it remains to calculate the number C of exact significant figures in MR. This is carried out as follows in the computing unit 15 (FIG. 5). The number C is given by the formula C=integer value of C', with $$C = -\log_b \frac{(VR,EVR)^{\frac{1}{2}}}{MR},$$

or $C' = -\frac{1}{2} \log_b (EVR,MR) + \log_b MR$. The value b is the numeration base, that is to say, 2 in the example illustrated by the FIGS. 1-5.

The unit 15 includes a register RVR and a register REVR connected respectively to those lines among the data lines 6 which are destined for VR and EVR.

The calculation of $(VR)^{\frac{1}{2}}$ is carried out by means of the unit 151 and transferred into a register RVR1, while (EVR) is divided by two by simple shifting to the right by one step.

The calculation of 1/MR is carried out by means of a unit 152 the input to which is connected to that line among the data lines 6 which is destined for MR, and the calculation of (RVR1)×(1/MR) is effected by a unit 153, the result being stored in a register RVR2 associated with an exponent register REVR2 into which is transferred the shifted content of REVR.

A unit 154 enables $$C = -\log_2 \frac{(VR,EVR)^{\frac{1}{2}}}{MR}$$

to be calculated, and the integer value truncated or rounded off from C' is stored in the register RNCR the output from which is connected to that line among the data lines 6 which is destined for the information NCR: "number of exact significant figures". This information is available at the output from the computer device through the command processor.

In the case where the results of the calculations carried out by the computer device are displayed, the information NCR may be employed for allowing only the number of exact significant figures to persist in the results.

For greater clarity there have not been represented on the drawings the command connections between the control member and the other constituents of the computer device, these being command connections which control especially:

the transfer of the pieces of data through the gates placed in the data transfer lines 5,6 and represented in FIGS. 2 to 5;
the shifts and storings in the registers; and
the units of the computing units.

Similarly, none of the connections that bring to the control member 3 the items of information necessary to it for commanding the shifts and the successions of the elementary operation are represented.

The description of these various connections following directly from the operation described above of the computing units 11, 12, 13 need not be explained in greater detail. In the foregoing, a computer assembly including separate units for carrying out the calculations of mean value, variance and the number of exact significant figures has been described. In addition, for the units 12 and 15, specific registers and computing units have been provided for the various operands.

Of course, only one particular embodiment has been chosen for convenience of the explanation.

One skilled in the art knows very well that the number of registers and computing units may be reduced with a view to achieving an optimum cost effective operation. Thus, an entirely independent computing unit for effecting the calculations of variance and of the number of exact significant figures need not be employed, but rather to employ for these calculations resources (registers and computing units) of the mean value computing unit, the latter being of conventional design.

In the foregoing description, a computer device working upon data in binary representation has been described.

Of course, the invention is applicable to calculations carried out upon data represented in other bases of numeration, for example, data in decimal or decimal coded binary or hexadecimal representation.

In this case the placing into the format n+1 of the mantissae of initial pieces of data in the format n may be effected as follows (FIG. 6).

With the mantissa MA of the piece of data A being available in a representation having n digits with its associated item of truncation information TA, the mean value mantissa MVA is worked out by adding at the end of lower significance an (n+1)th digit representing the decimal value 5 (that is to say, $\frac{1}{2}b^{-n}$, b being the base of numeration). In order to do this, the item of information TA is used to command AND-gates ET1, ET2, ET3, ET4, the inputs to which are supplied with signals at respective logical levels 0,1,0,1 in the order of decreasing significance. The outputs from these AND- gates are connected to the (n+1)th position of the register MVA.

When a mantissa of a piece of initial data of format n is to be put into the format (n+1), this mantissa is transferred into the first n positions in the register MVA and the quantity 0 or 5 is transferred into the (n+1)th position (according to whether TA=0 or TA=1) under the command C1.

When a mantissa of a non-initial piece of data of format (n+1) is to be stored in the register MVA, this mantissa is forwarded through the data line LA and stored in the register under the command CR.

In the calculations of mean values and of variances of results and of the number of exact significant figures one then operates in like fashion whatever the base of numeration.

Instead of employing a wired logic like that represented in FIG. 6, the placing in format of the mantissae of pieces of initial data may be carried out directly by the control member.

Numerical examples on a decimal base are given below, of implementing the method in accordance with the invention. These examples illustrate cases which are difficult for conventional computers.

For each stage of the calculation in each example there is calculated the denormalized result Rd, the variance $\sigma d^2$ associated with the denormalized result, the normalized result Rn in the double-length register, the truncated result Rt in the upper portion of the double-length register, the variance brought up to date, $\sigma t^2$ (addition of $(RRB)^2$) and the number C of exact significant figures.

All these results are given in the tables below. Opposite, in the last column of each table the exact result Re is represented.

Example 1

The following calculation is carried out:

$Z=(X+Y-X)/Y$ with $X = 7 \cdot 10^8$ and $Y = 2 \cdot 10^{-9}$

The format employed is such that $(n+1) = 4$. $C = -\infty$ signifies that the result obtained is completely wrong, that is to say, that no figure is exact. $C = \infty$ signifies that all of the figures are exact.

Example 2

The following calculation is carried out:

$$x = d \times d \quad y = d + x \quad u = y - x$$

with $d = 10^6$. The format employed is such that $(n+1) = 4$.

Example 3

The same calculation as in Example 2 is carried out with $d = 10^{-8}$.

Example 4

The same calculation as in Example 2 is carried out with $d = 10^2$.

Of course, various modifications or additions may be applied to the embodiments described above for the method and the computer device in accordance with the invention without thereby departing from the scope of the protection defined by the attached Claims.

Thus, one might work in double accuracy or in multiple accuracy by allowing longer calculating sequences and the storage of intermediate results in the local memory.

EXAMPLE 1

| | $R_d$ | $\sigma_d^2$ | $R_n$ | $R_t$ | $\sigma_{T2}$ | C | $R_e$ |
|---|---|---|---|---|---|---|---|
| X | $0.7 \cdot 10^9$ | 0 | $0.7 \cdot 10^9$ | $0.7 \cdot 10^9$ | 0 | $\infty$ | |
| Y | $0.2 \cdot 10^{-8}$ | 0 | $0.2 \cdot 10^{-8}$ | $0.2 \cdot 10^{-8}$ | 0 | $\infty$ | |
| $Y_d$ | $0.00000001 \cdot 10^9$ | 0 | $0.00000001 \cdot 10^9$ | $0.0000 \cdot 10^9$ | $1 \cdot 10^{-16}$ | $-\infty$ | |
| X + Y | $0.7000 \cdot 10^9$ | $1 \cdot 10^{-16}$ | $0.7000 \cdot 10^9$ | $0.7000 \cdot 10^9$ | $1 \cdot 10^{-16}$ | 7.8 | |
| (X + Y) − X | $0.0000 \cdot 10^9$ | $1 \cdot 10^{-16}$ | $0.0000 \cdot 10^9$ | $0.0000 \cdot 10^9$ | $1 \cdot 10^{-16}$ | $-\infty$ | |
| 1/Y | $5.0 \cdot 10^8$ | 0 | $0.5 \cdot 10^9$ | $0.5 \cdot 10^9$ | 0 | $\infty$ | |
| Z | $0.0000 \cdot 10^9$ | $0.25 \cdot 10^{-16}$ | $0.0000 \cdot 10^{18}$ | $0.0000 \cdot 10^{18}$ | $0.25 \cdot 10^{-16}$ | $-\infty$ | 1 |

$Y_d$ = Y denormalized with the last position of the double length register being looped back on itself.

EXAMPLE 2

| | $R_d$ | $\sigma_d^2$ | $R_n$ | $R_t$ | $\sigma_{T2}$ | C | $R_e$ |
|---|---|---|---|---|---|---|---|
| d | $0.1 \cdot 10^7$ | 0 | $0.1 \cdot 10^7$ | $0.1 \cdot 10^7$ | 0 | $\infty$ | $0.1 \cdot 10^7$ |
| x | $0.01 \cdot 10^{14}$ | 0 | $0.1 \cdot 10^{13}$ | $0.1 \cdot 10^{13}$ | 0 | $\infty$ | $0.1 \cdot 10^{13}$ |
| $d_d$ | $0.0000001 \cdot 10^{13}$ | 0 | | $0.0000 \cdot 10^{13}$ | $1 \cdot 10^{-14}$ | 0 | $0.0000001 \cdot 10^{13}$ |
| y | $0.1000 \cdot 10^{13}$ | $1 \cdot 10^{-14}$ | $0.1000 \cdot 10^{13}$ | $0.1000 \cdot 10^{13}$ | $1 \cdot 10^{-14}$ | 6 | $0.1000001 \cdot 10$ |
| u | $0 \cdot 10^{13}$ | $1 \cdot 10^{-14}$ | $0.0000 \cdot 10^{13}$ | $0.0000 \cdot 10^{13}$ | $1 \cdot 10^{-14}$ | 0 | $0.1 \cdot 10^7$ |

EXAMPLE 3

| | $R_d$ | $\sigma_d^2$ | $R_n$ | $R_t$ | $\sigma_{T2}$ | C | $R_e$ |
|---|---|---|---|---|---|---|---|
| d | $0.1 \cdot 10^{-7}$ | 0 | $0.1 \cdot 10^{-7}$ | $0.1 \cdot 10^{-7}$ | 0 | $\infty$ | $0.1 \cdot 10^{-7}$ |
| x | $0.01 \cdot 10^{-14}$ | 0 | $0.1 \cdot 10^{-15}$ | $0.1 \cdot 10^{-15}$ | 0 | $\infty$ | $0.1 \cdot 10^{-15}$ |
| $x_d$ | $0.000000011 \cdot 10^{-7}$ | 0 | | $0.0000 \cdot 10^{-7}$ | $1 \cdot 10^{-16}$ | 0 | $0.000000001$ |
| y | $0.1000 \cdot 10^{-7}$ | $1 \cdot 10^{-16}$ | $0.1000 \cdot 10^{-7}$ | $0.010 \cdot 10^{-7}$ | $1 \cdot 10^{-6}$ | 7 | $0.100000001$ |
| $u = y - x_d$ | $0.1000 \cdot 10^{-7}$ | $2 \cdot 10^{-16}$ | $0.1000 \cdot 10^{-7}$ | $0.1000 \cdot 10^{-7}$ | $2 \cdot 10^{-16}$ | 7 | $0.1 \cdot 10^{-7}$ |

EXAMPLE 4

| | $R_d$ | $\sigma_d^2$ | $R_n$ | $R_t$ | $\sigma_{T2}$ | C | $R_e$ |
|---|---|---|---|---|---|---|---|
| d | $0.1 \cdot 10^3$ | 0 | $0.1 \cdot 10^3$ | $0.1 \cdot 10^3$ | 0 | $\infty$ | $0.1 \cdot 10^3$ |
| x | $0.01 \cdot 10^6$ | 0 | $0.1 \cdot 10^5$ | $0.1 \cdot 10^5$ | 0 | $\infty$ | $0.1 \cdot 10^5$ |
| $d_d$ | $0.001 \cdot 10^5$ | 0 | | $0.001 \cdot 10^5$ | 0 | $\infty$ | $0.001 \cdot 10^5$ |
| $y = d_d + x$ | $0.1010 \cdot 10^5$ | 0 | $0.1010 \cdot 10^5$ | $0.1010 \cdot 10^5$ | 0 | $\infty$ | $0.1010 \cdot 10^5$ |
| $u = y - x$ | $0.0010 \cdot 10^5$ | 0 | $0.1000 \cdot 10^3$ | $0.1000 \cdot 10^3$ | 0 | $\infty$ | $0.1 \cdot 10^3$ |

What is claimed is:

1. A method of providing, by means of a digital computer device, the result of a calculation performed upon digital data having a floating point representation on a numberation base with the number of exact significant figures in this result, the digital data including pieces of initial data with each piece of initial data including a mantissa, the method comprising the steps of:

associating with the mantissa of each piece of initial data an item of error information having a floating point representation, which has a value of zero when the real value of the piece of initial data and the value thereof in the digital representation employed for the calculation coincide and which does not have a value of zero when the real value of the piece of initial data and the value thereof in the digital representation employed for the calculation do not coincide;

carrying out a first arithmetical operation upon first pieces of initial data by employing the digital representation and the item of error information of the mantissa of each of the first pieces of initial data in order to first calculate a mean value of the mantissa of the result and to secondly calculate an item of error information associated with said mean value of the mantissa of the result;

calculating each of other possible arithmetical operations of the calculation by employing, in case of need, as a non-initial piece of data, a result of a preceding operation, the mean value and the item of error information of the mantissa of this non-initial piece of data being the calculated mean value and the calculated error information of the mantissa of the result of the preceding operation, whereby a final result of the calculation is obtained; and determining the number of exact significant figures in the final result of the preceding step from the calculated values of the mean value and of the error information of the mantissa of said final result.

2. A method according to claim 1, further comprising the steps of:

truncating each of said pieces of initial data which cannot be exactly transcribed into the digital representation employed therefor;

associating with each piece of initial data an item of truncated information which has a first state when the real value of the mantissa thereof is truncated in the digital representation employed for the calculation and which has a second state when the real value of the mantissa thereof is not truncated in the digital representation employed for the calculation; and transforming each mantissa of a piece of initial data having n positions into a mantissa of mean value of length $n+1$ by introducing into the $(n+1)$th position thereof the value $(\frac{1}{2})b^{-n}$, where b is said numberation base, when the truncation information associated with the respective piece of initial data is in its first state and a zero value when the truncation information associated with the respective piece of initial data is in its second state;

the mean value of the mantissa of the result of an operation carried out upon the truncated piece of initial data being the mean value of all the possible combinations of values approximated from above and from below of the truncated mantissae of the pieces of initial data.

3. A method according to claim 2, wherein each result of an arithmetical operation comprises a mean value and an associated item of error information each in the form of a mantissa together with an associated exponent, said method further comprising the steps of normalizing, in case of need, the mantissa of mean value of each result of an arithmetical operation and during each step of normalization, one of decrementing and incrementing the exponent of the respective mean value by a number of steps which is a function of the number of shifts of the respective mantissa, and one of decrementing and incrementing the exponent of the associated item of error information by a double number of steps when the respective item of error information is one of a variance and standard deviation thereof raised to the second power.

4. A method according to claim 3, further comprising the step of bringing up to date the associated item of error information for each truncation and rounding-off of the mantissa of the result by employing one of the truncated portion of the mantissa and its complement with respect to the base.

5. A method according to claim 1, further comprising the step of associating with each piece of data employed in the calculation an item of binary information having a first state when this piece of data is a piece of initial data and a second state when this piece of data has already undergone at least one arithmetical process.

6. A device for providing the result of a calculation performed upon ditital data having a floating point representation on a numberation base with the number of exact significant figures in this result, the device being of the type including at least one computer unit, at least one register for the exponent of an operand and one register for the mantissa of the operand, a local memory and a control member for emitting signals commanding the execution of elementary operations as a function of instructions delivered by a command memory and relative to successive arithmetical operations to be effected whereby a final result of the calculation is obtained, said device comprising:

at least one first mantissa register having $n+1$ positions for the mantissa of a mean value of a piece of data and at least one corresponding first exponent register for the exponent of the mean value of said piece of data;

at least one second mantissa register for the mantissa of an item of information of error in data and and at least one corresponding second exponent register for the exponent of the item of information of said error in data;

said computer unit comprising:

means connected to said registers for said mantissae and exponents to calculate the result of of each arithmetical operation performed upon pieces of data and to provide said operation result in the form of a mean value of result and an associated item of error information each having a respective mantissa and exponent, and means connected to said registers for said mantissae and exponents to calculate the number of exact significant figures in the mantissa of the calculated mean value of said final result; and said control member being connected to said registers and said computer unit to control the execution of each elementary operation of each arithmetical operation and of the calculation of said number of exact significant figures.

7. A device according to claim 6, in which the device includes at least one double length third mantissa register for storing the calculated mantissa of the mean value of each result of an arithmetical operation, having $(2n+2)$ positions, and means for performing one of rounding off and truncation of the $n+1$ positions of lowest significance of said double length register so as to provide the mantissa of mean value of a calculated result, in the form of a word having a length equal to $n+1$.

8. A device according to claim 7, in which the item of error information associated with the mean value is the variance, and further including means connected to said double length register for raising to the second power one of the truncated portion and the complement with respect to the base of the truncated portion of the contents of said double length register so as to bring up to date the variance associated with the mantissa which has been taken off.

9. A device according to claim 7 or 8, in which the position of lowest significance in a low portion of said double length register for the mantissa of the mean value of the result is looped back on itself.

* * * * *